(12) United States Patent
Bastian et al.

(10) Patent No.: US 12,076,912 B2
(45) Date of Patent: Sep. 3, 2024

(54) SYSTEMS AND METHODS OF CELLULAR-HULL INFILL STRUCTURE GENERATION FOR ADDITIVE MANUFACTURING

(71) Applicant: Autodesk, Inc., San Francisco, CA (US)

(72) Inventors: Andreas Linas Bastian, Berkeley, CA (US); Gregory David Meess, Berkeley, CA (US)

(73) Assignee: Autodesk, Inc., San Francisco, CA (US)

( * ) Notice: Subject to any disclaimer, the term of this patent is extended or adjusted under 35 U.S.C. 154(b) by 1637 days.

(21) Appl. No.: 15/296,910

(22) Filed: Oct. 18, 2016

(65) Prior Publication Data

US 2018/0104912 A1 Apr. 19, 2018

(51) Int. Cl.
*B29C 64/112* (2017.01)
*B29C 64/106* (2017.01)
*B29C 64/386* (2017.01)
*B33Y 10/00* (2015.01)
*B33Y 30/00* (2015.01)
*B33Y 50/02* (2015.01)
*H04N 1/00* (2006.01)

(52) U.S. Cl.
CPC .......... *B29C 64/112* (2017.08); *B29C 64/106* (2017.08); *B29C 64/386* (2017.08); *B33Y 10/00* (2014.12); *B33Y 30/00* (2014.12); *B33Y 50/02* (2014.12); *H04N 1/00* (2013.01); *H04N 1/00827* (2013.01); *G05B 2219/49023* (2013.01)

(58) Field of Classification Search
None
See application file for complete search history.

(56) References Cited

U.S. PATENT DOCUMENTS 5,137,662 A    8/1992 Hull et al.
5,948,342 A    9/1999 Nakazawa et al.
(Continued)

OTHER PUBLICATIONS

Taylor Landry, MatterHackers.com, Slice Settings Explained—Part 1, https://www.matterhackers.com/articles/slice-settings-explained-part-1, May 6, 2015.*

(Continued)

*Primary Examiner* — James M Mellott
(74) *Attorney, Agent, or Firm* — Fish & Richardson P.C.

(57) ABSTRACT

Methods, systems, and apparatus, including medium-encoded computer program products, for generating internal structures usable in additive manufacturing include, in at least one aspect, obtaining a three dimensional (3D) model of a 3D object to be manufactured by a 3D extrusion printer; defining an infill structure for the 3D model, wherein defining the infill structure comprises defining an internal hull separated from an external hull by a separation distance, wherein the external hull corresponds to the 3D model, and defining walls between the external hull and the internal hull to form cells between the external hull and the internal hull; and providing the 3D model and the infill structure for the 3D model to generate tool path data for the 3D extrusion printer to build the 3D object in accordance with the 3D model and the infill structure for the 3D model.

36 Claims, 7 Drawing Sheets

(56) References Cited

U.S. PATENT DOCUMENTS

| | | | |
|---|---|---|---|
| 10,556,418 | B2 | 2/2020 | Bastian et al. |
| 2003/0222366 | A1 | 12/2003 | Stengel et al. |
| 2010/0262272 | A1 | 10/2010 | Shkolnik et al. |
| 2014/0017651 | A1 | 1/2014 | Sugimoto et al. |
| 2016/0221262 | A1 | 8/2016 | Das et al. |
| 2016/0224017 | A1 | 8/2016 | Huang et al. |
| 2017/0031207 | A1 | 2/2017 | Li |
| 2017/0072627 | A1 | 3/2017 | Li |
| 2017/0294050 | A1 | 10/2017 | Popescu |
| 2018/0059631 | A1 | 3/2018 | Newell et al. |
| 2018/0150993 | A1 | 5/2018 | Newell et al. |
| 2018/0229446 | A1 | 8/2018 | Bastian et al. |
| 2019/0163167 | A1 | 5/2019 | Roychowdhury et al. |

OTHER PUBLICATIONS

Taylor Landry, MatterHackers.com, Slice Settings Explained—Part 2, https://www.matterhackers.com/articles/slice-settings-explained-part-2, Jun. 1, 2015.*

Taylor Landry, MatterHackers.com, Slice Settings Explained—Part 3, https://www.matterhackers.com/articles/slice-settings-explained---part-3, Jul. 7, 2015.*

3d Tutorial, Nested Dodecahedron, 3dsmax, Luxxeon 3D, found at https://www.youtube.com/watch?v=c-55LauzlAl, Jul. 7, 2015.*

Oliver Age 24, https://www.youtube.com/watch?v=W50GtLrxLyk, Jul. 17, 2014.*

Unknown author, "3D Printing Tips: Infill Percentage and Pattern Explained," (Aug. 29, 2016) [online] (retrieved from http://3dplatform.com/3d-printing-tips-infill-percentage-and-pattern-explained/), 11 pages.

Unknown author, "A Better Way to Design High-performance Structures," (Aug. 29, 2016) [online] (retrieved from http://machinedesign.com/archive/better-way-design-high-performance-structures), 7 pages.

Unknown author, "Isogrid—Wikipedia, the free encyclopedia," (Aug. 29, 2016) [online] (retrieved from https://en.wikipedia.org/wiki/Isogrid), 3 pages.

Unknown author, "Slic3r Manual—Infill Patterns and Density," (Aug. 29, 2016) [online] (retrieved from http://manual.slic3r.org/expert-mode/infill), 7 pages.

Unknown author, "Joint Model: Voronoi," (Sep. 29, 2016) [online] (retrieved from https://www.rocscience.com/help/phase2/webhelp/phase2_model/Joint_Model_Voronoi . . . ), 3 pages.

Jin et al., "Optimization of Process Planning for Reducing Material Consumption in Additive Manufacturing," Journal of Manufacturing Systems, 2017, 44:65-78.

Liu et al., "Current and Future Trends in Topology Optimization for Additive Manufacturing," Structural and Multidisciplinary Optimization, May 2018, published online at https://doi.org/10.1007/s00158-018-1994-3, 28 pages.

Lu et al., "Build-to-Last: Strength to Weight 3D Printed Objects," ACM Transactions on Graphics (TOG) TOG Homepage, vol. 33, Issue 4, Jul. 2014, Article No. 97, New York, NY, Article No. 97, 10 pages.

Wang et al., "Support-free Hollowing," IEEE Transactions on Visualization and Computer Graphics, Oct. 2018, 24(10):2787-2798.

Wu et al., "Infill Optimization for Additive Manufacturing-Approaching Bone-like Porous Structures," (Nov. 19, 2016) [online] (retrieved from https://arxiv.org/abs/1608.04366v2), 14 pages.

Examiner Nahida Sultana, Non-final Office Action in U.S. Appl. No. 15/432,693, mailed Jun. 25, 2019, 14 pages.

Fish & Richardson, Response to Non-final Office Action in U.S. Appl. No. 15/432,693, filed Aug. 29, 2019, 15 pages.

Notice of Allowance and Fee(s) Due in U.S. Appl. No. 15/432,693, mailed Nov. 27, 2019, 10 pages.

Barber et al., "The Quickhull Algorithm for Convex Hulls," ACM Transactions on Mathematical Software (TOMS), 22(4): 1-15, Dec. 1996.

"correspond—Cambridge Dictionary," (Feb. 20, 2020) [online] (retrieved from https://dictionary.cambridge.org/us/dictionary/english/correspond), 3 pages.

"hull—Cambridge Dictionary," (Feb. 20, 2020) [online] (retrieved from https://dictionary.cambridge.org/us/dictionary/english/hull), 3 pages.

"membrane—Cambridge Dictionary," (Feb. 20, 2020) [online] (retrieved from https://dictionary.cambridge.org/us/dictionary/english/membrane), 3 pages.

"wall—Cambridge Dictionary," (Feb. 20, 2020) [online] (retrieved from https://dictionary.cambridge.org/us/dictionary/english/wall), 4 pages.

* cited by examiner

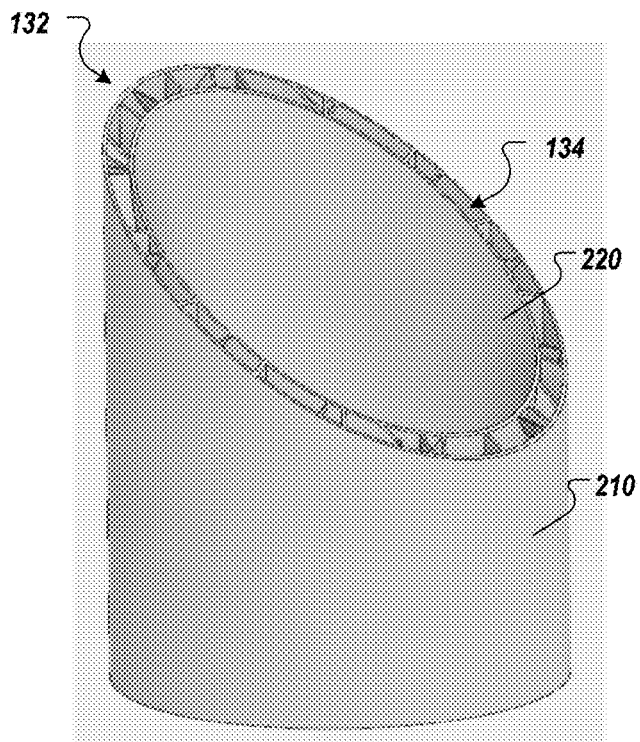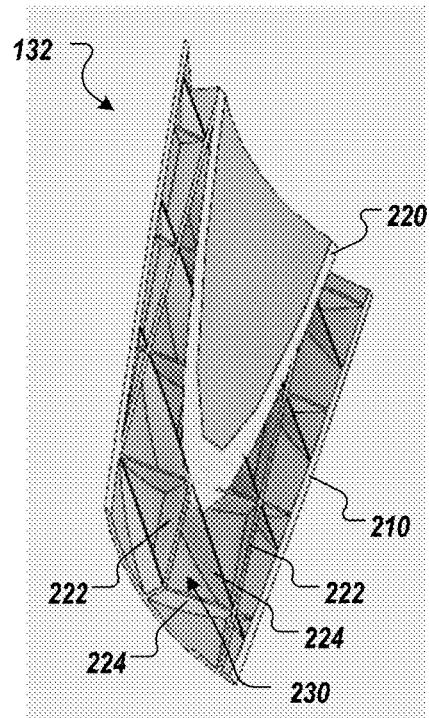
FIG. 2A    FIG. 2B
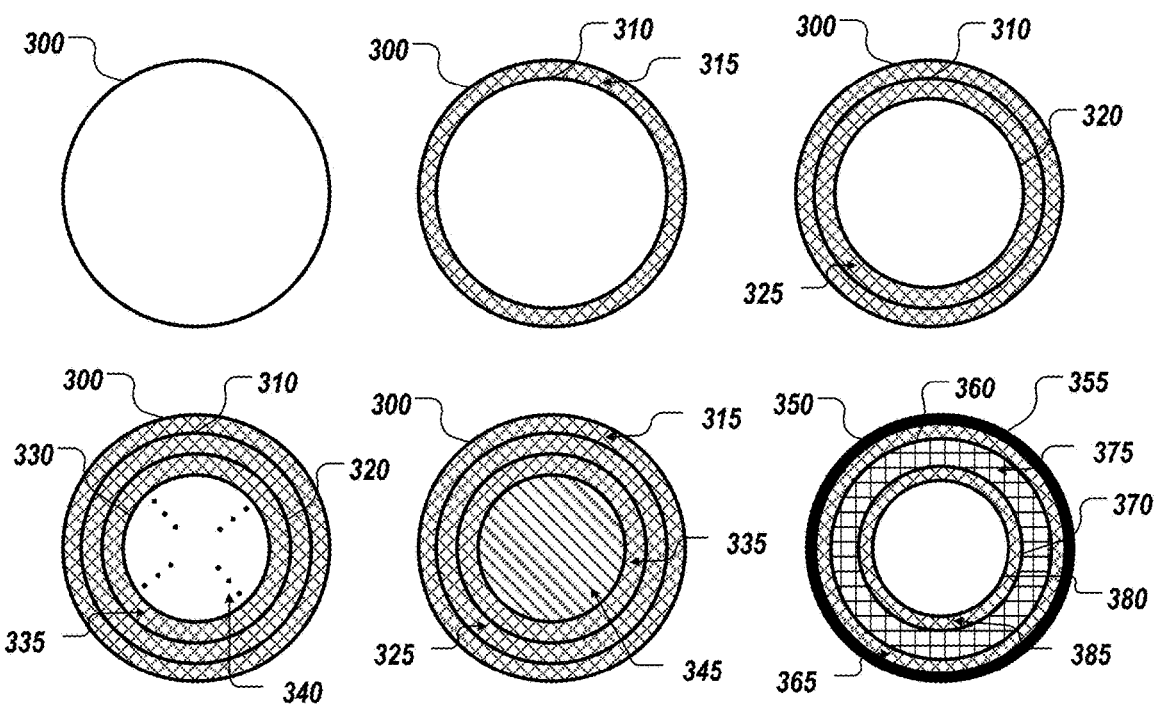
FIG. 3

SYSTEMS AND METHODS OF CELLULAR-HULL INFILL STRUCTURE GENERATION FOR ADDITIVE MANUFACTURING

BACKGROUND

This specification relates to additive manufacturing, such as fused filament fabrication (FFF) three dimensional (3D) printing.

FFF using extruded polymer filament is useful for manufacturing three dimensional objects. Current FFF printing is typically accomplished by forcing a solid plastic feedstock through a heated nozzle. The filament is liquefied before or as it passes through the constriction in the nozzle, and the feed pressure causes material to be extruded to form a beam of material added, layer by layer, to build the object. 3D models of objects can be designed using computer-aided design (CAD) software and then converted to toolpaths for the nozzle of a 3D extrusion printer, either by the CAD software or separate software, often referred to as a slicer. In addition, various techniques have been employed by slicer software to define tool paths for infill material to be 3D printed inside an object to be manufactured by the 3D printer.

SUMMARY

This specification relates to additive manufacturing, such as fused filament fabrication (FFF) three dimensional (3D) printing. In general, one or more aspects of the subject matter described in this specification can be embodied in one or more systems that include one or more computer storage media having instructions stored thereon; and one or more data processing apparatus configured to execute the instructions to perform operations including obtaining a three dimensional (3D) model of a 3D object to be manufactured by a 3D extrusion printer, defining an infill structure for the 3D model, wherein defining the infill structure includes defining an internal hull separated from an external hull by a separation distance, wherein the external hull corresponds to the 3D model, and defining walls between the external hull and the internal hull to form cells between the external hull and the internal hull, and providing the 3D model and the infill structure for the 3D model to generate tool path data for the 3D extrusion printer to build the 3D object in accordance with the 3D model and the infill structure for the 3D model. Implementations according to this aspect may include one or more of the following features.

Each of the walls can form a continuous membrane in the 3D object, once built, and defining the walls can include: identifying when an angle of a wall passes a threshold; and thickening the wall to ensure extrusions of the 3D extrusion printer maintain a minimum thickness of the continuous membrane formed for the wall in the 3D object, once built. In some implementations, a thickness of the internal hull is set equal to a thickness of the external hull in accordance with a user input. Moreover, defining the walls can include forming an isogrid (or other grid structures or patterns of polygons, such as hexagons) between the external hull and the internal hull.

Defining the walls can include tessellating irregular polygons between the external hull and the internal hull. Tessellating the irregular polygons can include adjusting parameters of the tessellating to functionally align reinforcement of the 3D model by the infill structure.

The operations can include: simulating structural properties of the 3D model with the infill structure included; comparing the simulated structural properties to specified structural characteristics; adjusting at least one parameter governing the defining of the infill structure for the 3D model to improve the simulated structural properties in relation to the specified structural characteristics; and repeating the defining of the infill structure for the 3D model and the simulating to achieve the specified structural characteristics. The adjusting can include adjusting one or more parameters selected from a group of parameters including the hull separation distance, a size of the cells, a volume of the cells, a shape of the cells, and wall thickness. Moreover, the system can include the 3D extrusion printer, and the operations can include generating the tool path data for the 3D extrusion printer, where the 3D extrusion printer builds the 3D object in accordance with the 3D model and the infill structure for the 3D model using the tool path data.

Particular embodiments of the subject matter described in this specification can be implemented to realize one or more of the following advantages. Infill structures are generated by a computer program in an intentional manner that can both reduce the total amount of infill material used and also result in a stronger 3D object being built by additive manufacturing. Using z-continuous structures (infill structures that do not have gaps between extruded beams in the vertical, z, 3D print direction) can generate stiffer infill structures that are less prone to buckling and subject to lower stresses than traditional "log-cabin" structures used as infill. Further, structures internal to the 3D object being manufactured can be automatically generated so as to take into account the overall structure of the 3D object. In some cases, a user can be given control over the nature and amount of internal structures that are generated while also ensuring that specified structural properties for the final 3D object being manufactured are satisfied.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 2A and 2B show perspective views of a 3D model with internal structures generated for the 3D model.

FIG. 3 shows examples of internal structures generated for a 3D model.

Like reference numbers and designations in the various drawings indicate like elements.

DETAILED DESCRIPTION

Figure 1:
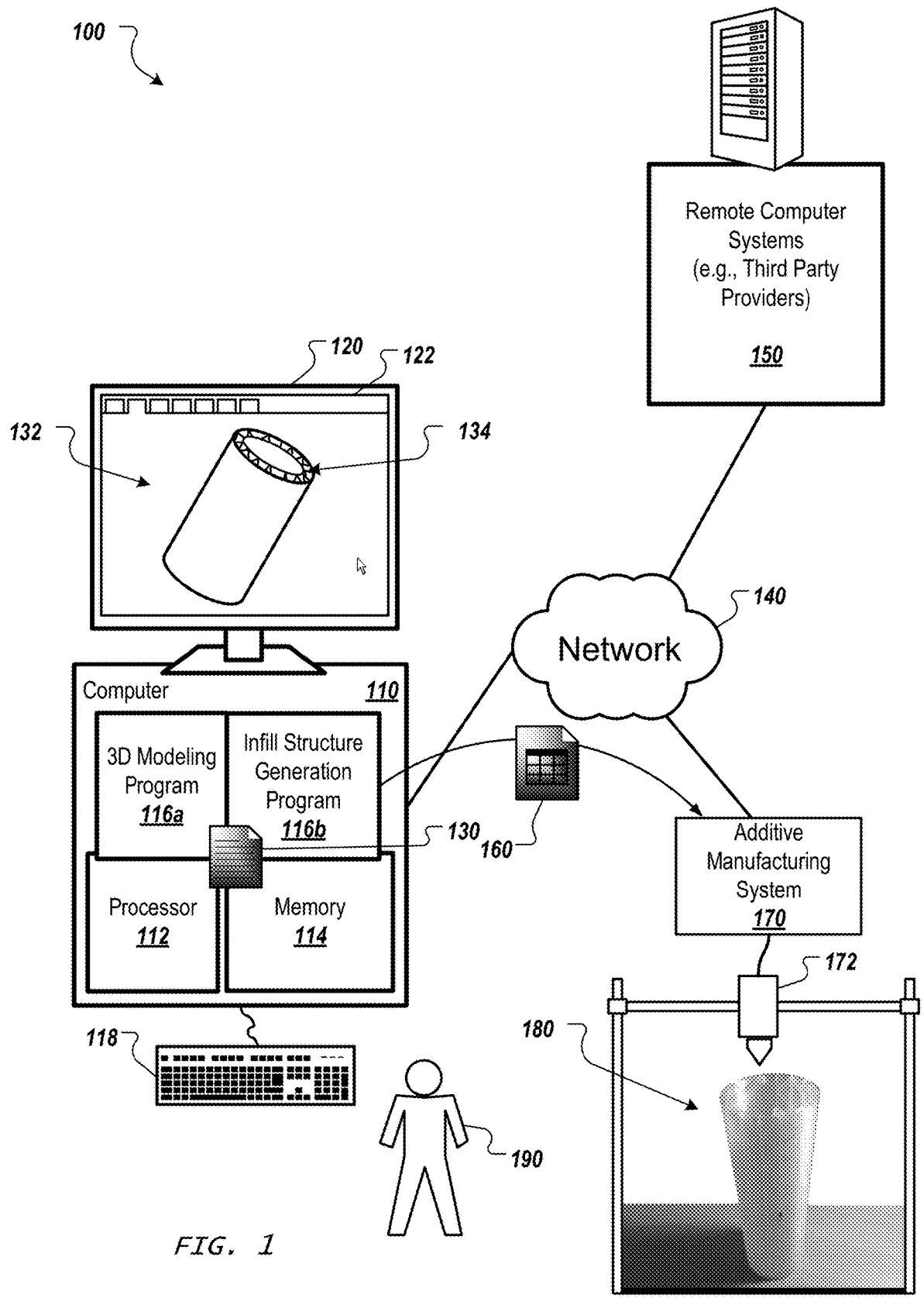
FIG. 1 shows an example of a system to design and manufacture objects using additive manufacturing techniques.

FIG. 1 shows an example of a system 100 to design and manufacture objects using additive manufacturing techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116a to create a 3D model 132. This can be done using known graphical user interface tools. In the example shown, the 3D model 132 is a simple cylinder, but such a structure is not required. Rather, various suitable forms of 3D model 132 can be created to represent a wide variety of 3D objects that can be manufactured using additive manufacturing systems and techniques. In some implementations, the programs that run on the processor 112 include a slicer program, an infill structure generation program 116b, a tool path generation program, etc. Such programs can be separate from the 3D modeling program 116a or integrated into the 3D modeling program 116a or into each other. Thus, a "program" as referenced herein can be a procedure within another program. Moreover, in some implementations, such program(s) run on a processor in an additive manufacturing system 170, which can also include processor(s) and memory and constitute a computer, similar to computer 110.

In various implementations, the 3D modeling program 116a is programed to provide various user interface elements to enable the user 190 to design the 3D model 132, specify materials and loading cases, perform simulation, etc. Once the user 190 is satisfied with the model 132, the 3D model 132 is stored as a document 130 and/or used to generate another representation of the model (e.g., an .STL file for additive manufacturing). This can be done upon request by the user 190, or in light of the user's request for another action, such as sending the 3D model 132 to the additive manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116a is used to create the 3D model 132.

Further, to prepare the 3D model 132 for 3D printing, the infill structure generation program 116b is used to create internal structures 134 for the 3D model 132. In some implementations, this generation of internal structures 134 is done automatically by the computer when the 3D model 132 is to be built using the additive manufacturing system 170. In some implementations, this generation of internal structures 134 is done based on user input, such as part of the design phase of the 3D model 132.

For example, the infill structure generation program 116b can be part of the 3D modeling program 116a, and the internal structures 134 can be created as geometry of the 3D model 132 (e.g., boundary representations (Breps), constructive solid geometry (CSG), non-uniform rational basis spline (NURBS), etc.) and stored in the document 130. These structures 134 will thus be part the 3D model 132 when it is converted to a document 160 (of an appropriate format, such as G-code) for use by the additive manufacturing system 170. In other words, the CAD software on the computer 110 can provide the functionality described herein. In other implementations, a slicer (or similar) program can provide the functionality described herein. In such implementations, the internal structures 134 are generated when the 3D model 132 is converted into printing instructions for the 3D printer. Note that such implementations include those in which the functionality described herein is performed by a computer in the additive manufacturing system 170.

In any case, the additive manufacturing system 170 (e.g., an FFF 3D printer) includes at least one tool 172 that operates in a build volume to create a 3D object 180, which corresponds to the 3D model 132 with the internal structures 134 added thereto. Although represented in FIG. 1 as an XYZ FFF 3D printer, it should be understood that the additive manufacturing system 170 represents many possible types of 3D printers, including delta 3D printers and other systems that can employ more than one type of tool, including potentially subtractive manufacturing tools. In addition, although this disclosure focuses on extrusion based 3D printing, the systems and techniques described can be employed with other additive manufacturing techniques, such as granular techniques (e.g., Selective Laser Sintering (SLS) and Direct Metal Laser Sintering (DMLS)) and photopolymer techniques (e.g., stereolithography (SLA) and Digital Light Processing (DLP) 3D printing). Note that when applied to such other systems, powder or resin egress should be a consideration, and so internal cell wells should have holes to allow un-cured or un-sintered material to exit the structure. Note also that direct-metal wire and power-feed technologies can be used to make such hollow structures without filling the cavities with un-melted material.

FIG. 2A shows a perspective view of the 3D model 132 with an angled cutaway to show the internal structures 134 added thereto. In this example, the original model 132 includes an external hull 210. To create the internal structures 134, an internal hull 220 is created within the external hull 210, and then walls are added between the internal hull 220 and the external hull 210.

FIG. 2B shows a perspective view of the 3D model 132 with more of the model cutaway to reveal additional details of the internal structures. In this example, the walls between the external hull 210 and the internal hull 220 are created in the form of an isogrid. The volume of space between the external hull 210 and the internal hull 220 is divided in a horizontal plane (relative to the Z print direction) by vertical walls 222. The volume of space between each pair of vertical walls 222 is then divided vertically (relative to the Z print direction) using angled walls, such as slanted walls 224. Thus, all the space between the external hull 210 and the internal hull 220 is divided up into cells, such as closed cell

230, which is by defined slanted walls 224, vertical wall 222, and the external hull 210 and the internal hull 220. Note that this is just one example of internal structures that can be created for a 3D model. Many other forms of internal structures are possible.

FIG. 3 shows additional examples of internal structures generated for a 3D model. These examples continue with the example of a 3D model that is a simple cylinder, for clarity of the presentation, and FIG. 3 shows a series of slices of the 3D model is the XY plane (the horizontal plane relative to the Z print direction). An external hull 300 corresponds to an external surface defined in the 3D model. Depending on user inputs and the current stage of processing, this means the external hull 300 can be the external surface of the 3D model or an internal hull generated a specified distance within the external surface of the 3D model (e.g., a last of one or more internal perimeters, e.g., as specified by a user, added just inside the 3D model's external surface to thicken the exterior wall of the 3D model, or a previous internal hull that is now being treated as an external hull for a next stage of processing).

An internal hull 310 is created inside the external hull 300, where these two hulls are separated by a distance, which can be specified by a user, or determined by the software (e.g., subject to user control). In some implementations, the separation distance is the normal distance between the surfaces 300, 310. Other approaches are also possible. In any case, the separation distance creates a volume of space between the two hulls 300, 310 that is then filled with walls 315 to form cells between the external hull 300 and the internal hull 310. Note that various shapes and patterns can be used to define the walls 315 between the hulls 300 and 310, as will be described in further detail below; the hatching pattern shown in the figure is used to represent the space that the internal structures will occupy and is not used to indicate that actual structural pattern itself.

In many cases, a single internal hull is all that is needed to create a strong final structure for the 3D object to be manufactured. However, in some cases one or more additional internal hulls can be added. Thus, another internal hull 320 can be created, and additional walls 325 can be added between the internal hull 320 and the now external hull 310 (i.e., the hull 310 is external to the hull 320 even though it is internal to the hull 300). Further, another internal hull 330 can be added, and additional walls 335 added between the internal hull 330 and the now external hull 320. This process can be repeated 340 until the entire volume within the 3D model (or nearly the entire volume) is filled with these internal structures.

In some implementations, these additional internal hulls need not be added. In some implementations, after adding one or more internal hulls, plus internal walls forming cells, the remaining volume within the 3D model can be filled with traditional infill 345. Note that this traditional infill 345 can assist in providing a base for top layers in FFF printing. Moreover, this traditional infill 345 can be of very low density since the internal hull structure can provide all the additional part strength needed.

In addition, many variations are possible here, including changing the types of internal wall structures used from one hull section to the next, changing the separation distance from one hull section to the next, etc. For instance, FIG. 3 shows a final example where a user has specified a minimum thickness for the external surface of the 3D object to be additively manufactured from the 3D model. Thus, a first external hull 350 used by the internal structure generation process is separated from the exterior surface 355 of the model by a specified amount, and this separation distance will be entirely filled in with building material in the additive manufacturing process of the 3D object. Further, in this example, internal walls 365 between hulls 350 and 360 are of a first type with a first thickness, internal walls 375 between hulls 360 and 370 are of a second type with a second thickness, which is different from the first, and internal walls 385 between hulls 370 and 380 are of the first type with the first thickness.

As will be appreciated, many variations are possible here. In addition, although described in the context of a simple cylinder, it is understood that the described systems and techniques are applicable to many complex objects that can be 3D modeled with CAD software. In general, one or more smaller versions of the 3D object being manufactured are created within the object's 3D model, similar to matryoshka dolls (also known as Russian nesting dolls) where each doll is a smaller version of the last and sits inside the previous doll. Between each smaller version of the object, in the 3D model, and the larger version it is contained by, connecting walls are formed to create cells between the two hulls of the 3D model. Note that internal structures created in this manner are similar to traditional infill in 3D printing in that additional strength can be created in the 3D printed part being manufactured, subject to user control, with less material being used to form the part than would be needed if it was made entirely solid. Moreover, substantial increases in strength can be realized with less material and with faster printing times than traditional infill.

Figure 4A:
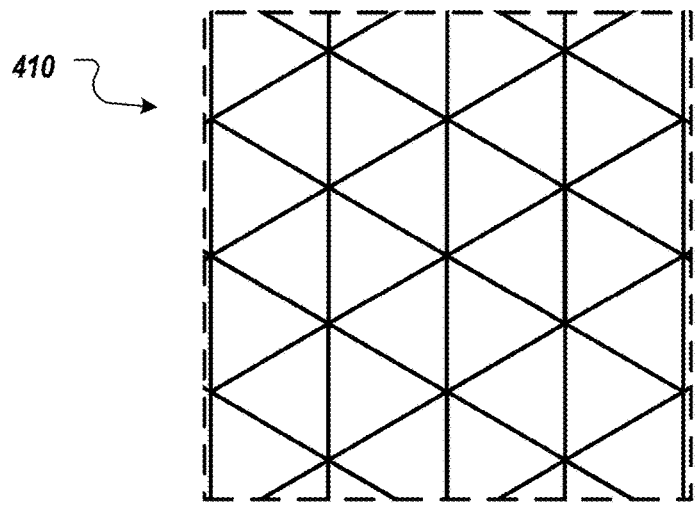
FIGS. 4A-4C show examples of internal wall shape patterns for use in generating infill structures for a 3D model.
Figure 4B:
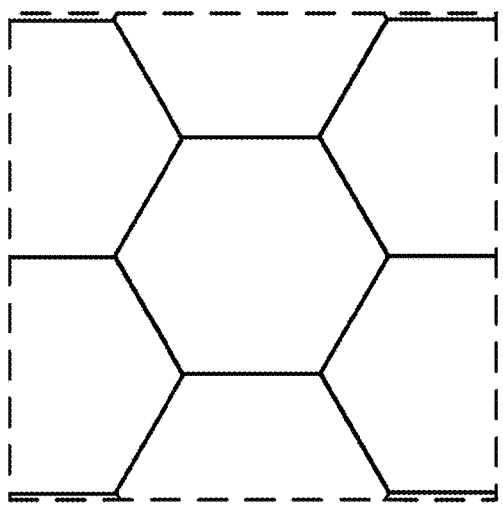
Figure 4C:
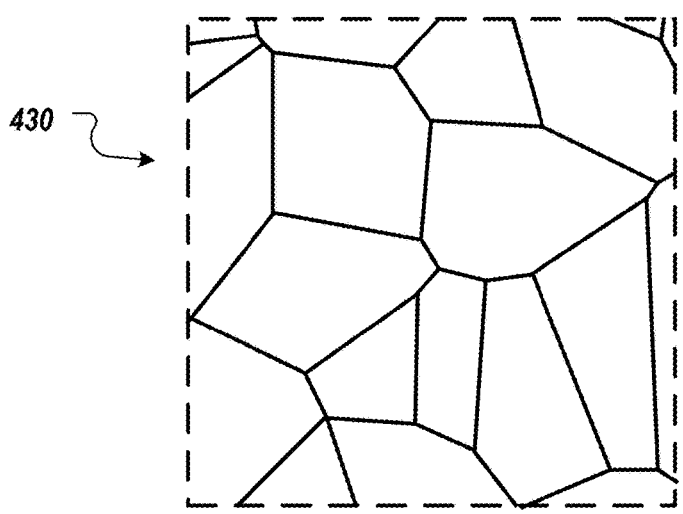

FIGS. 4A-4C show examples of internal wall shape patterns for use in generating infill structures for a 3D model. These examples show the shape pattern that is used to fill the space between two hulls. FIG. 4A shows an isogrid pattern 410, which is the same shape pattern used to create the internal walls shown in FIG. 2B. This type of internal structure can add significant strength to 3D objects to be manufactured. Various other grid structures can be used, including orthogrid and various waffle type patterns.

In general, many different types of regular polygons can be tessellated to form patterns for the internal walls between the hulls in the 3D structure. FIG. 4B shows an example of a hexagon pattern 420 that can be used. Moreover, irregular polygons can be tessellated to form the patterns for the internal walls between the hulls in the 3D structure. FIG. 4C shows an irregular polygon pattern 430 generated by Voronoi tessellation. Further, in some implementations, irregular polygons are tessellated based on the 3D model itself to create functionally-aligned reinforcement for the 3D model. For example, in places of the 3D model that need more strength, the tessellating can be adjusted to reduce the size of the polygons to create more cells formed by more wall material, to orient the internal walls to assist in transferring forces through the object, or both. Additionally, the aspect ratio of the polygons can be varied to align the cells with the tensile stresses, and cells can be arranged in tighter configurations to reduce buckling when under compression.

Figure 5A:
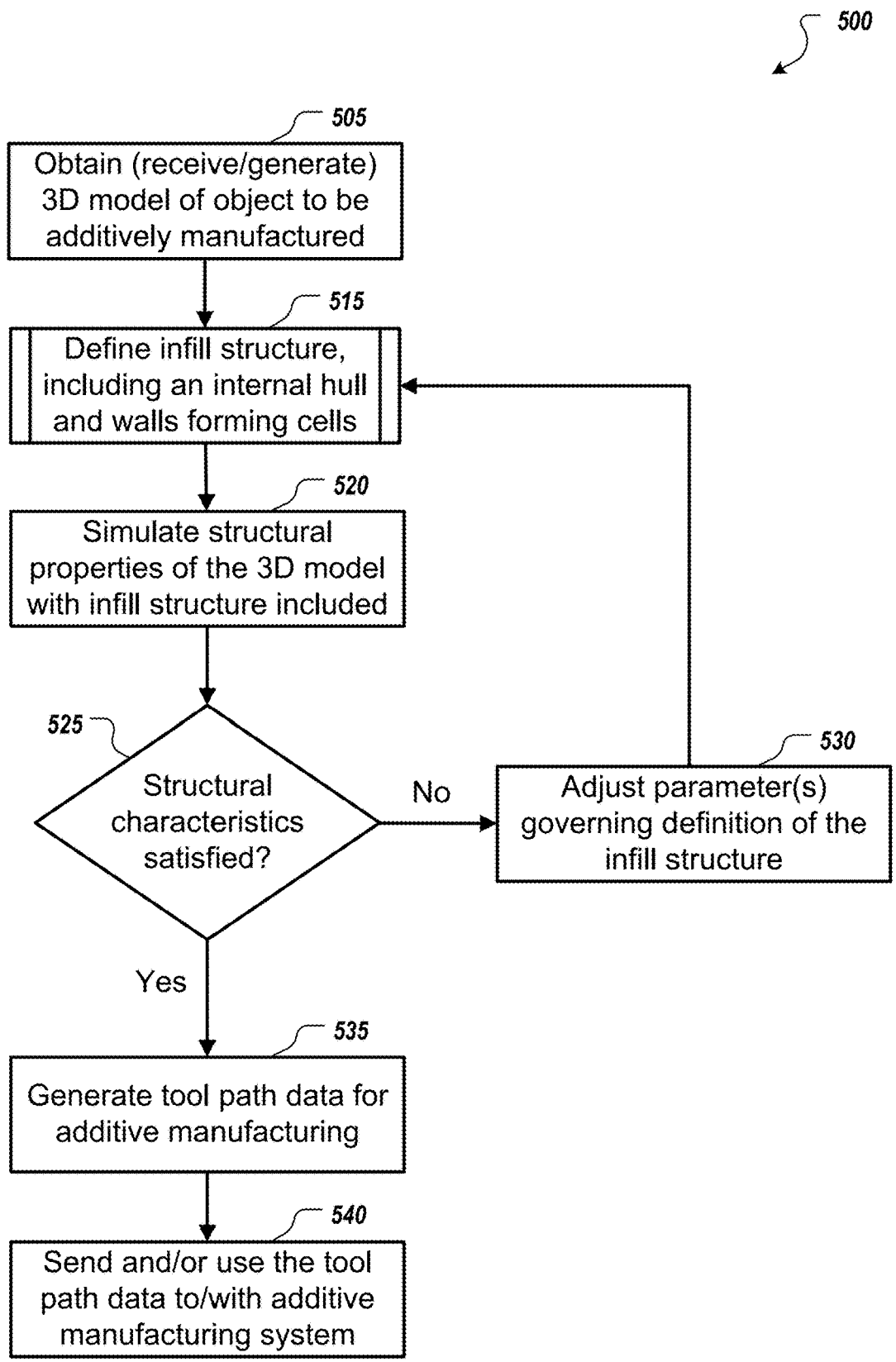
FIGS. 5A and 5B show examples of processes for generating internal structures for a 3D model.

FIG. 5A shows an example of a process 500 for generating internal structures for a 3D model. The 3D model is obtained 505, where the 3D model is a model of an object that can be additively manufactured (e.g., 3D printed with a FFF 3D printer). Obtaining 505 the 3D model can include receiving the 3D model from another source or location, e.g., loading the 3D model from a permanent storage device (e.g., a disk drive). Alternatively or additionally, obtaining 505 the 3D model can include generating the 3D model based on received input (e.g., creating the 3D model in CAD software based on user input).

Once the 3D model is obtained 505, infill structure is defined 515 for the 3D model. This includes defining an internal hull separated from an external hull by a separation distance. In some implementations, the separation distance is specified by a user. In some implementations, the separation distance is specified by the software. For example, in some implementations, a user can set a range of values acceptable for the separation distance, and the software can select a distance value within this range based on the details of the geometry of the 3D model.

In addition, defining 515 the infill structure includes defining walls between the external hull and the internal hull to form cells between the external hull and the internal hull. Some of these may be vertical walls in relation to the Z print direction (e.g., as directed by a user when the 3D model orientation for printing is selected by the user). The walls 222 in the isogrid structure described above in connection with FIG. 2B are an example of such vertical walls. However, in practice, many if not all the internal walls between the two hulls will be angled or slanted. In implementations using extrusion based 3D printers, note that extrusions should maintain contact with a previous extrusion defining the wall so as to create a continuous membrane in the manufactured object. Using continuous membranes for the infill structure can result in improved structural characteristics in the manufactured object, as described in further detail below.

The process 515 to define the internal infill structures for the 3D model can be implemented in various ways. In any case, once an appropriate internal structure is created for the 3D model, the 3D model and the infill structure for the 3D model can be provided for use in additive manufacturing. For example, the 3D model and the infill structure for the 3D model can be saved together for later loading and printing. As another example, the 3D model and the infill structure for the 3D model can be output to another program for further processing, such as to generate tool path data for a 3D extrusion printer to build a 3D object in accordance with the 3D model and the infill structure for the 3D model.

In addition, in some implementations, an optimization process can be performed to arrive at a desirable internal structure for the 3D model. For example, structural properties of the 3D model are simulated 520 with the infill structure included. This can include using FEA (Finite Element Analysis) simulation, such as using FEA for stiffness optimization. The simulated structural properties are then checked 525 against structural characteristics that have been specified for the object being modeled. The desirable structural characteristics can be specified by a user, specified by a software component of a system, or a combination of these. The desired structural characteristics can correspond to more than one design goal, and so there can be more than one optimization routine and more than one optimization parameter (e.g., light-weighting for a given stiffness target, and a target level of thermal insulation are two examples of multiple possible optimization parameters). Note that a user may need to decide how to weigh different optimization goals, unless certain goals are derived from geometry of the 3D model (e.g., based on interferences and obstacles).

While the desired structural characteristics are not adequately satisfied, one or more parameters that govern the creation of the infill structure for the 3D model are adjusted 530 to improve the simulated structural properties in relation to the specified structural characteristics. The parameter(s) that are adjusted can include: the hull separation distance, the size of the cells formed by the internal walls, the volume of the cells formed by the internal walls, the wall thickness, the shape of the cells formed by the walls, or a combination of two or more of these. The process 500 then repeats the defining 515 of the infill structure, using the adjusted parameter(s), and the simulating 520 of the 3D model with the infill structure included. This repetition can continue until an optimization threshold value (e.g., as set by a user) is reached where there is diminishing returns on further iterations. In some implementations, initial values for the parameter(s) are set as proportional to the geometry of the 3D model, e.g., start the cell size at 5% of the largest dimension of the part, and the steps in these value(s) for each iteration to achieve the desired performance goals are also set as proportional to the geometry of the 3D model, e.g., adjustments that are 1% of the largest dimension of the part.

Once sufficient progress is made to achieving the desired performance goals for the object to be manufactured, tool path data can be generated 535 for use in additive manufacturing. This can involve passing the 3D model and the generated internal structures to a slicer program to generate G-code that is able to cause a specific type of 3D printer to build the object. This tool path data can then be sent 540 to (or used 540 with) the additive manufacturing system to build the object.

Figure 5B:
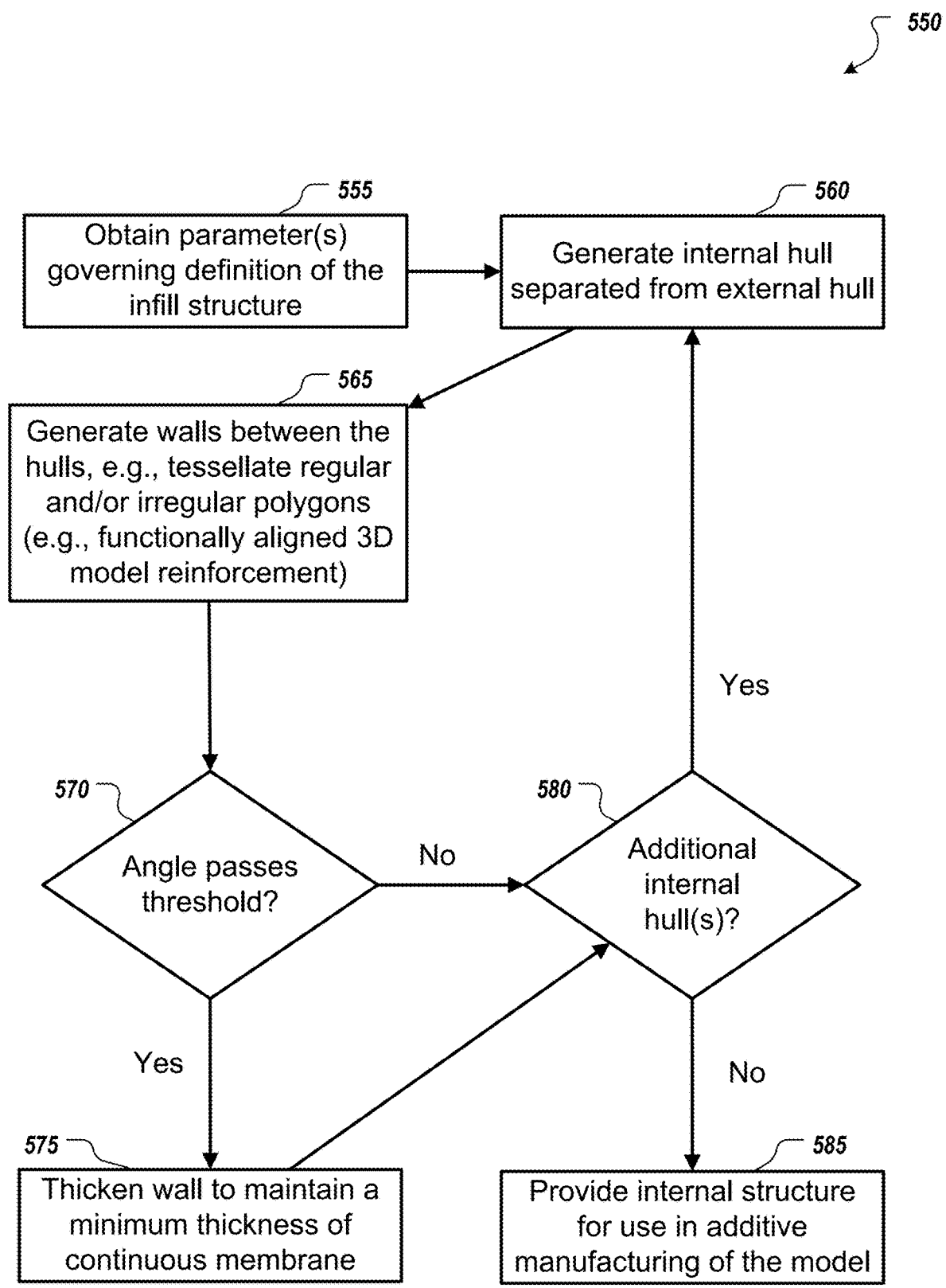

FIG. 5B shows an example of a process 550 for generating internal structures for a 3D model, which can be used as the process 515 from FIG. 5A. One or more parameters that govern the definition of the infill structure are obtained 555. These parameters can include the hull separation distance, the size of the cells formed by the internal walls, the volume of the cells formed by the internal walls, the wall thickness, the shape of the cells formed by the walls, or a combination of two or more of these. In some implementations, all the parameters used for the cellular hull construction are user specified. In other implementations, one or more of the parameters are determined by the software based on functional requirements and/or geometry analysis.

An internal hull is generated 560 within an external hull, where the two hulls are separated by the separation distance. In some implementations, the separation distance is the normal distance between the surfaces of the two hulls. In some implementations, the internal hull is created by scaling down the external hull. In some implementations, the thickness of the internal hull is set equal to the thickness of the external hull (e.g., in accordance with user input). In some implementations, the thickness of the internal hull can be set to be different than the thickness of the external hull (e.g., a user may specify a number of internal perimeters for the 3D model, thus specifying a total thickness of the outermost surface of the 3D object, whereas the user may specify a different thickness for the internal hull(s) created inside the object).

Moreover, note that since the internal hull will necessarily be smaller than the external hull, some features of the external hull can be removed. For example, a minimum feature size can be used, and if a feature of the internal hull will be smaller than this minimum feature size, this small feature of the internal hull can be removed. In an implementation using meshes, when facets of the mesh get smaller than a minimum size, these facets can be removed, and the remaining facets can be connected to heal the mesh at the point of removal. Conceptually, this can be understood as the 3D model losing feature detail when a smaller version of the 3D model is created as an internal hull for the infill structure. In some cases, the internal hull can be more than one hull, depending on the geometry. For example, in the case of an hourglass, if the radius of the neck between the two lobes is smaller than the internal hull offset distance, then various courses of action are possible, including: forming two internal hulls rather than one (e.g., one internal hull for each lobe of the hourglass), adjusting the offset distance dynamically to ensure that an internal hull can be produced in areas that have the small radius or where internal hull formation would be dimensionally difficult with a constant offset.

Once the internal hull has been created, walls are generated 565 between the inner and outer hulls. In some implementations, this involves tessellating a regular polygon across the manifold defined by the space between the inner and outer hulls, and then projecting the pattern of polygons into the third dimension of this manifold. This results in walls between the inner and outer hulls, where these walls form cells, and each of these cells has a shape defined by the polygon and a width defined by the hull separation distance. In some implementations, generating 565 the walls between the inner and outer hulls involves tessellating irregular polygons across the manifold defined by the space between the inner and outer hulls, and then projecting the pattern of irregular polygons into the third dimension of this manifold. For example, Voronoi tessellation can be used to generate the shapes of the polygons and thus the resulting cells between the inner and outer hulls. In addition, in some implementations, one or more parameters of the tessellating are adjusted to functionally align reinforcement of the 3D model by the infill structure that results from the pattern of irregular polygons.

In some implementations, a check 570 is made to identify when an angle of a wall passes a threshold. This can be done after all the walls are generated 565, or as an integral part of the wall generation 565. In either case, if the angle of a wall passes the threshold (e.g., the angle is less than forty five degrees measured relative to the print bed) then the wall is thickened 575 to maintain a minimum thickness of the continuous membrane built in the 3D object from the wall. As explained above, the internal walls will not always be vertical, and it is preferable that extrusions maintain contact with previous extrusion defining the wall so as to create a continuous membrane. Lower angle (measured relative to horizontal) walls can thus be thickened to cause additional extrusions in the XY plane to create a membrane of the same effective thickness as a vertical membrane.

In some implementations, more than one internal hull can be added to a 3D model, and so a check 580 can be made to determine if an additional internal hull needs to be generated. If so, the process repeats at 560, with the previously created internal hull now acting as the external hull for the next iteration. Once all the appropriate internal hulls and walls have been created, the generated internal structure for the 3D model is provided 585 for use in additive manufacturing. For example, the 3D model and the infill structure for the 3D model can be saved together for later loading and printing. As another example, the infill structure for the 3D model can be output to another program for further processing, such as to generate tool path data for a 3D extrusion printer to build a 3D object in accordance with the 3D model and the infill structure for the 3D model.

Figure 5C:
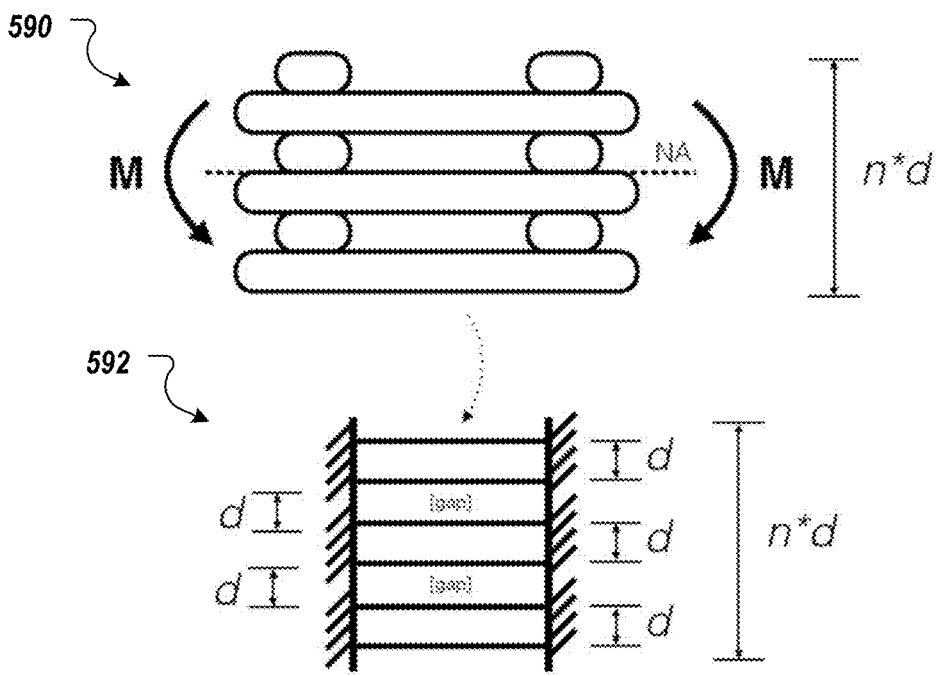
FIGS. 5C and 5D show examples of internal structures formed by an extrusion based 3D printer.
Figure 5D:
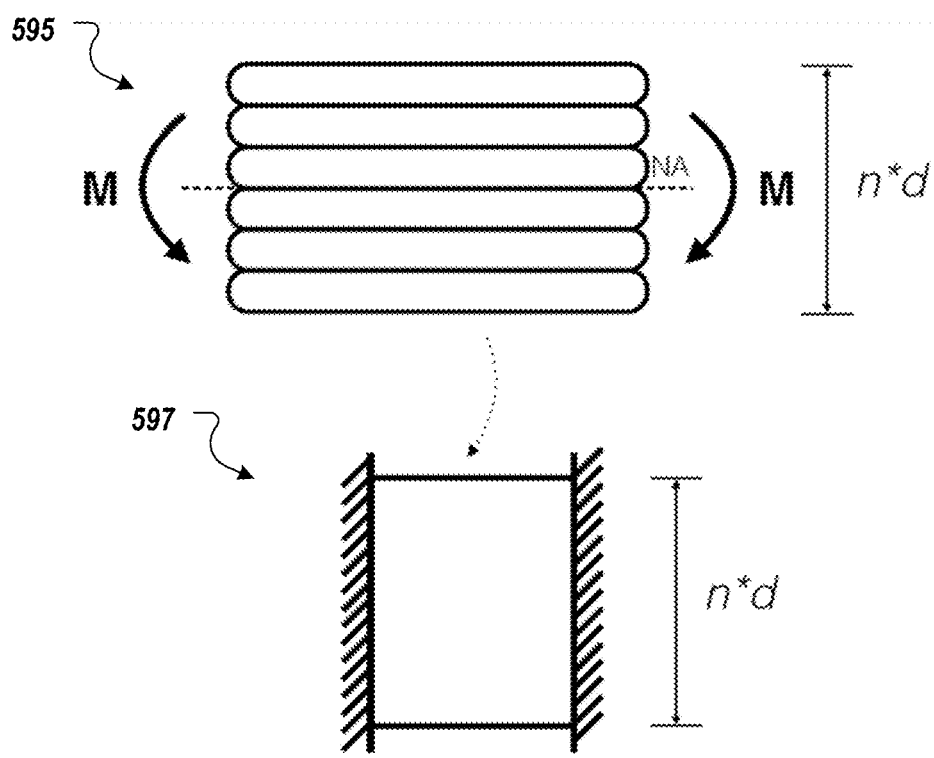

In addition, as noted above, using continuous membranes for the infill structure can result in improved structural characteristics in the manufactured object. FIGS. 5C and 5D show examples of internal structures formed by an extrusion based 3D printer to further illustrate this point. In FIG. 5C, a schematic shows an XZ section of traditional two dimensional (2D) prismatic infill, which creates a "log-cabin" structure 590 of individual depositions. To determine the effective beam section of moment (M) of this traditional infill, the structure 590 can be understood as a series of beams 592 having the width and thickness (d) of the constituent depositions, separated by gaps of the layer height (also d).

In contrast, in FIG. 5D, a schematic shows an XZ section of z-sequential depositions that are laminated directly without alternating direction. As shown, this eliminates the "log-cabin" effect of traditional infill patterns, and the resulting structure 595 is closer to a single beam. This effective beam structure can be understood as a continuous beam section 597 of height nd (where n is the number of extrusion beads, and d is the thickness of each extrusion bead) and width w of the constituent depositions.

Table 1 below compares the second moment of area between effective beam profiles for the log-cabin structure 590 and the continuous beam structure 595:

TABLE 1

Second Moment of Area Comparison between Effective Beam Profiles

| | Second Moment of Area $I = \frac{wd^3}{12}$ | Trend |
|---|---|---|
| Log-Cabin 590 | $I_{LC} = \sum_{i=0}^{\frac{n}{2}} (I_i + A_i y_i^2)$ | Second moment of area lower and scales n^2. |
| Continuous Beam 595 | $I_c = \frac{w(nd)^3}{12}$ | Second moment of area higher scales as n^3. |

In the equations in Table 1, $y_i$ is the distance of constituent cross section from neutral axis, w is the width of the effective beam (i.e., nozzle width), $A_i$ is the area of constituent cross section, $I_{total}$ is the total effective beam second moment of area, and $I_i$ is the second moment of area of constituent cross section.

Table 2 below compares the Euler buckling force between the effective beam profiles for the log-cabin structure 590 and the continuous beam structure 595:

TABLE 2

Euler Buckling Force in Effective Beams

| | Euler Buckling Force $F = \frac{\pi^2 EI}{(KL)^2}$ | Trend |
|---|---|---|
| Log-Cabin 590 | $F = \frac{\pi^2 EI_{LC}}{(KL)^2}$ | For a cell wall of length L, buckling force is lower (scales with $I_{LC}$). |
| Continuous Beam 595 | $F = \frac{\pi^2 EI_C}{(KL)^2}$ | For a cell wall of length L, buckling force is higher (scales with $I_C$). |

In the equations in Table 2, K is the column effective length factor (0.50 for a beam with both ends fixed), E is the Young's modulus of material, L is the length of the beam, $I_{LC}$ is the second moment of area of a log-cabin beam section, and $I_C$ is the second moment of area of a continuous beam section.

Table 3 below compares the maximum normal stress in the effective beam profiles for the log-cabin structure 590 and the continuous beam structure 595:

TABLE 3

Maximum Normal Stress in Effective Beams

| | Max Bending Moment $\sigma = \frac{My}{I_x}$ | Trend |
|---|---|---|
| Log-Cabin 590 | $\sigma = \frac{My}{I_{LC}}$ | For an applied moment M, the stress at the extents of the effective beam will be higher (and scale with $I_{LC}$). |
| Continuous Beam 595 | $\sigma = \frac{My}{I_C}$ | For an applied moment M, the stress at the extents of the effective beam will be lower (and scale with $I_C$). |

In the equations in Table 3, y is the distance at which stress is calculated (nd/2), w is the width of effective beam (i.e., nozzle width), M is the applied moment, $I_{LC}$ is the second moment of area of a log-cabin beam section, and $I_C$ is the second moment of area of a continuous beam section. As shown in the tables above, z-continuous structures are stiffer, less-prone to buckling, and subject to lower stresses than traditional "log-cabin" structures that result from many common 2D prismatic infill structures.

Figure 6:
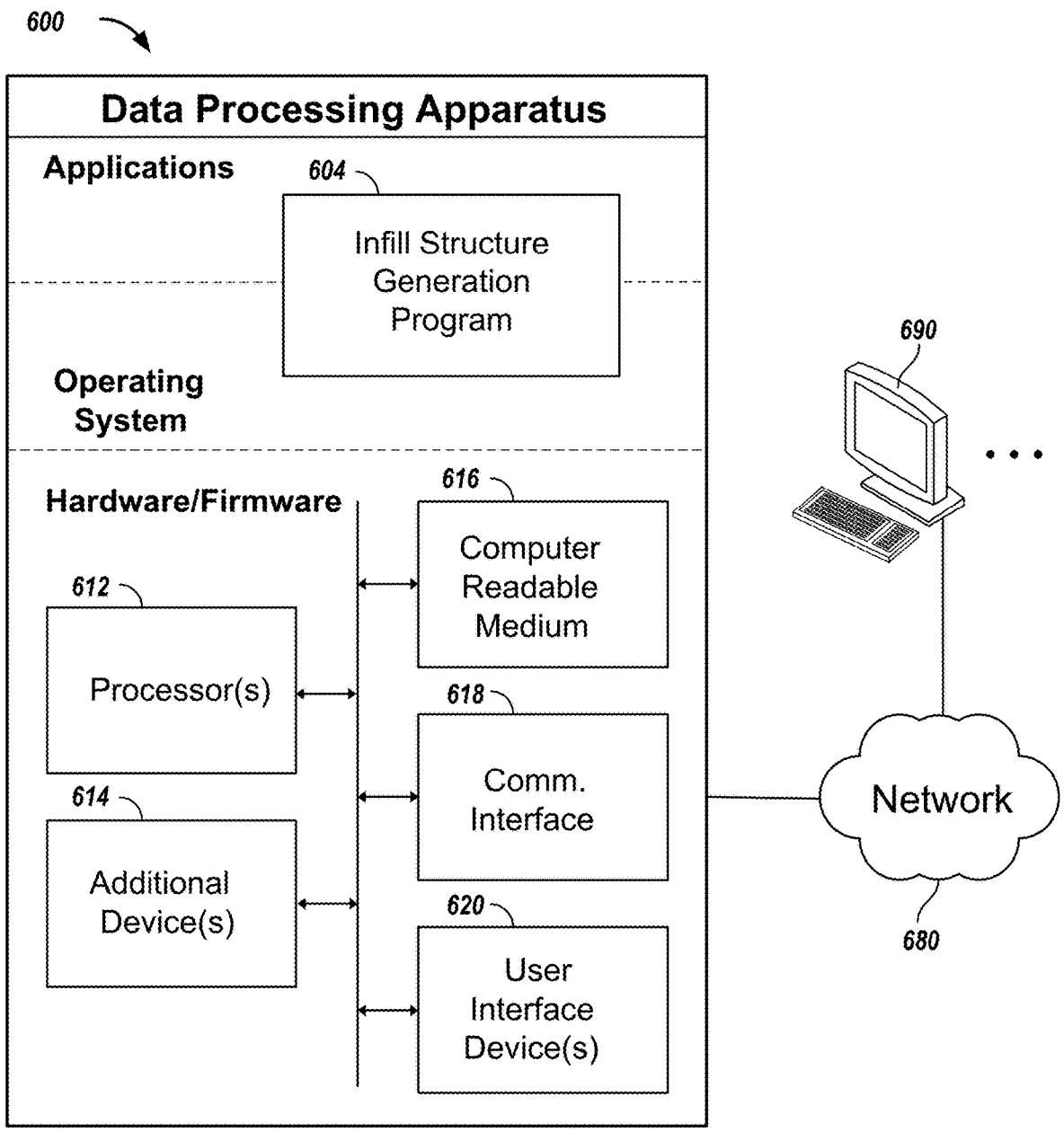
FIG. 6 is a schematic diagram of a data processing system including a data processing apparatus, which can be programmed to implement the processes described herein.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of an infill structure generation program 604, such as described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over the network 680. Examples of user interface devices 620 include a display, a camera, a speaker, a microphone, a tactile feedback device, a keyboard, and a mouse. The data processing apparatus 600 can store instructions that implement operations associated with the modules described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the invention have been described. Other implementations are within the scope of the following claims. In addition, the actions recited in the claims can be performed in a different order and still achieve desirable results.

What is claimed is:

1. A computer-implemented method comprising:
    obtaining, by an infill structure generation program, a three dimensional (3D) model of a 3D object to be manufactured by a 3D extrusion printer;
    creating, by the infill structure generation program, an infill structure for the 3D model, wherein creating the infill structure comprises
        generating an internal hull separated from an external hull by a separation distance, wherein the external hull corresponds to an external surface of the 3D model, and the internal hull is a scaled down version of the external hull, such that a shape of the internal hull takes into account an overall structure of the 3D object, and
        generating walls between the external hull and the internal hull by tessellating at least one polygon across a manifold defined by a space between the external hull and the internal hull to form a pattern of polygons, and projecting the pattern of polygons in a third dimension of the manifold to form the walls between the external hull and the internal hull, thereby forming cells in the space between the external hull and the internal hull; and
    causing the 3D extrusion printer to build the 3D object in accordance with the 3D model and the infill structure for the 3D model, including 3D printing the infill structure, which provides increased strength for the 3D object with less material being used during 3D printing of the 3D object.

2. The method of claim 1, wherein each of the walls between the external hull and the internal hull forms a continuous membrane in the 3D object, once built, the continuous membrane being extruded beams having no gaps between the extruded beams in a build direction of the 3D printing, and generating the walls comprises:
    identifying that an angle of at least one of the walls, measured relative to a print bed of the 3D extrusion printer, passes a threshold, which reduces a thickness of the at least one of the walls to be below a minimum thickness for the continuous membrane; and
    thickening the at least one of the walls to ensure extrusions of the 3D extrusion printer maintain the minimum thickness of the continuous membrane formed for the at least one of the walls in the 3D object, once built.

3. The method of claim 2, wherein all the space between the external hull and the internal hull is divided up by the walls into closed cells, and the minimum thickness for the continuous membrane is a same effective thickness as a vertical wall membrane in the 3D object.

4. The method of claim 1, wherein causing the 3D extrusion printer to build the 3D object comprises filling a remaining volume inside the internal hull with traditional infill.

5. The method of claim 1, wherein tessellating the at least one polygon comprises tessellating irregular polygons across the manifold defined by the space between the external hull and the internal hull.

6. The method of claim 5, wherein tessellating the irregular polygons comprises adjusting parameters of the tessellating to functionally align reinforcement of the 3D model by the infill structure including, in at least one region of the 3D model where more strength is needed, reducing a size of the irregular polygons in the at least one region of the 3D model, thereby increasing a number of the walls in the at least one region.

7. The method of claim 5, wherein tessellating the irregular polygons comprises using Voronoi tessellation to form the pattern of polygons.

8. The method of claim 5, wherein tessellating the irregular polygons comprises adjusting one or more parameters of the tessellating to functionally align reinforcement of the 3D model by the infill structure including, in at least one region of the 3D model, orienting the walls formed by the irregular polygons in the at least one region of the 3D model to assist in transferring forces through the 3D object.

9. The method of claim 5, wherein tessellating the irregular polygons comprises adjusting one or more parameters of the tessellating to functionally align reinforcement of the 3D model by the infill structure including, in at least one region of the 3D model, varying an aspect ratio of the irregular polygons in the at least one region to align the cells in the at least one region with tensile stresses in the 3D object.

10. The method of claim 5, wherein tessellating the irregular polygons comprises adjusting one or more parameters of the tessellating to functionally align reinforcement of the 3D model by the infill structure including, in at least one region of the 3D model, arranging the cells in the at least one region in tighter configurations to reduce buckling under compression for the 3D object.

11. The method of claim 1, comprising:
simulating structural properties of the 3D model with the infill structure included;
comparing the simulated structural properties to specified structural characteristics corresponding to at least one design goal comprising light-weighting for a given stiffness target or achieving a target level of thermal insulation for the 3D object;
adjusting at least one parameter governing the creating of the infill structure for the 3D model to improve the simulated structural properties in relation to the specified structural characteristics; and
repeating the creating of the infill structure for the 3D model and the simulating until the specified structural characteristics are achieved.

12. The method of claim 11, wherein the adjusting comprises adjusting parameters comprising the separation distance and wall thickness.

13. The method of claim 11, wherein the adjusting comprises adjusting a shape of the cells.

14. The method of claim 11, wherein the at least one parameter comprises a size of the cells, an initial value for the size of the cells is set as a first percentage of a largest dimension of the 3D object, and the adjusting comprises adjusting the size of the cells in each iteration by a second percentage of the largest dimension of the 3D object, the second percentage being smaller than the first percentage.

15. The method of claim 11, wherein the adjusting comprises adjusting a volume of the cells formed by the walls between the external hull and the internal hull.

16. The method of claim 1, comprising wherein the causing comprises:
generating tool path data for the 3D extrusion printer based on the 3D model and the infill structure; and
sending the tool path data to the 3D extrusion printer.

17. The method of claim 1, wherein tessellating the at least one polygon comprises forming an isogrid by tessellating a triangle across the manifold defined by the space between the external hull and the internal hull, and the walls comprise both vertical walls and angled walls relative to a build direction of the 3D printing.

18. The method of claim 1, wherein the infill structure is created as geometry of the 3D model, and creating the infill structure comprises removing one or more features of the internal hull that are each smaller than a minimum feature size.

19. A non-transitory computer-readable medium encoding instructions operable to cause one or more data processing apparatus to perform operations comprising:
obtaining, by an infill structure generation program, a three dimensional (3D) model of a 3D object to be manufactured by a 3D extrusion printer;
creating, by the infill structure generation program, an infill structure for the 3D model, wherein creating the infill structure comprises
generating an internal hull separated from an external hull by a separation distance, wherein the external hull corresponds to an external surface of the 3D model, and the internal hull is a scaled down version of the external hull, such that a shape of the internal hull takes into account an overall structure of the 3D object, and
generating walls between the external hull and the internal hull by tessellating at least one polygon across a manifold defined by a space between the external hull and the internal hull to form a pattern of polygons, and projecting the pattern of polygons in a third dimension of the manifold to form the walls between the external hull and the internal hull, thereby forming cells in the space between the external hull and the internal hull; and
causing the 3D extrusion printer to build the 3D object in accordance with the 3D model and the infill structure for the 3D model, including 3D printing the infill structure, which provides increased strength for the 3D object with less material being used during 3D printing of the 3D object.

20. The non-transitory computer-readable medium of claim 19, wherein each of the walls between the external hull and the internal hull forms a continuous membrane in the 3D object, once built, the continuous membrane being extruded beams having no gaps between the extruded beams in a build direction of the 3D printing, and generating the walls comprises:
identifying that an angle of at least one of the walls, measured relative to a print bed of the 3D extrusion printer, passes a threshold, which reduces a thickness of the at least one of the walls to be below a minimum thickness for the continuous membrane; and thickening the at least one of the walls to ensure extrusions of the 3D extrusion printer maintain the minimum thickness of the continuous membrane formed for the at least one of the walls in the 3D object, once built.

21. The non-transitory computer-readable medium of claim 20, wherein all the space between the external hull and the internal hull is divided up by the walls into closed cells, and the minimum thickness for the continuous membrane is a same effective thickness as a vertical wall membrane in the 3D object.

22. The non-transitory computer-readable medium of claim 19, wherein causing the 3D extrusion printer to build the 3D object comprises filling a remaining volume inside the internal hull with traditional infill.

23. The non-transitory computer-readable medium of claim 19, wherein tessellating the at least one polygon comprises forming an isogrid by tessellating a triangle across the manifold defined by the space between the external hull and the internal hull, and the walls comprise both vertical walls and angled walls relative to a build direction of the 3D printing.

24. The non-transitory computer-readable medium of claim 19, wherein tessellating the at least one polygon comprises tessellating irregular polygons across the manifold defined by the space between the external hull and the internal hull.

25. The non-transitory computer-readable medium of claim 24, wherein tessellating the irregular polygons comprises adjusting parameters of the tessellating to functionally align reinforcement of the 3D model by the infill structure including, in at least one region of the 3D model where more strength is needed, reducing a size of the irregular polygons in the at least one region of the 3D model, thereby increasing a number of the walls in the at least one region.

26. The non-transitory computer-readable medium of claim 24, wherein tessellating the irregular polygons comprises using Voronoi tessellation to form the pattern of polygons.

27. The non-transitory computer-readable medium of claim 24, wherein tessellating the irregular polygons comprises adjusting one or more parameters of the tessellating to functionally align reinforcement of the 3D model by the infill structure including, in at least one region of the 3D model, orienting the walls formed by the irregular polygons in the at least one region of the 3D model to assist in transferring forces through the 3D object.

28. The non-transitory computer-readable medium of claim 24, wherein tessellating the irregular polygons comprises adjusting one or more parameters of the tessellating to functionally align reinforcement of the 3D model by the infill structure including, in at least one region of the 3D model, varying an aspect ratio of the irregular polygons in the at least one region to align the cells in the at least one region with tensile stresses in the 3D object.

29. The non-transitory computer-readable medium of claim 24, wherein tessellating the irregular polygons comprises adjusting one or more parameters of the tessellating to functionally align reinforcement of the 3D model by the infill structure including, in at least one region of the 3D model, arranging the cells in the at least one region in tighter configurations to reduce buckling under compression for the 3D object.

30. The non-transitory computer-readable medium of claim 19, wherein the operations comprise:
simulating structural properties of the 3D model with the infill structure included;
comparing the simulated structural properties to specified structural characteristics corresponding to at least one design goal comprising light-weighting for a given stiffness target or achieving a target level of thermal insulation for the 3D object;
adjusting at least one parameter governing the creating of the infill structure for the 3D model to improve the simulated structural properties in relation to the specified structural characteristics; and
repeating the creating of the infill structure for the 3D model and the simulating until the specified structural characteristics are achieved.

31. The non-transitory computer-readable medium of claim 30, wherein the adjusting comprises adjusting parameters comprising the separation distance and wall thickness.

32. The non-transitory computer-readable medium of claim 30, wherein the adjusting comprises adjusting a shape of the cells.

33. The non-transitory computer-readable medium of claim 30, wherein the at least one parameter comprises a size of the cells, an initial value for the size of the cells is set as a first percentage of a largest dimension of the 3D object, and the adjusting comprises adjusting the size of the cells in each iteration by a second percentage of the largest dimension of the 3D object, the second percentage being smaller than the first percentage.

34. The non-transitory computer-readable medium of claim 30, wherein the adjusting comprises adjusting a volume of the cells formed by the walls between the external hull and the internal hull.

35. The non-transitory computer-readable medium of claim 19, wherein the causing comprises:
generating tool path data for the 3D extrusion printer based on the 3D model and the infill structure; and
sending the tool path data to the 3D extrusion printer.

36. The non-transitory computer-readable medium of claim 19, wherein the infill structure is created as geometry of the 3D model, and creating the infill structure comprises removing one or more features of the internal hull that are each smaller than a minimum feature size.

* * * * *

UNITED STATES PATENT AND TRADEMARK OFFICE
CERTIFICATE OF CORRECTION

| | | |
|---|---|---|
| PATENT NO. | : 12,076,912 B2 | Page 1 of 1 |
| APPLICATION NO. | : 15/296910 | |
| DATED | : September 3, 2024 | |
| INVENTOR(S) | : Andreas Linas Bastian and Gregory David Meess | |

It is certified that error appears in the above-identified patent and that said Letters Patent is hereby corrected as shown below:

In the Claims

Column 16, Line 9, in Claim 16: before "wherein" delete "comprising".

Signed and Sealed this
Fifteenth Day of October, 2024

Katherine Kelly Vidal
*Director of the United States Patent and Trademark Office*